United States Patent
Chiu et al.

(10) Patent No.: US 7,392,969 B2
(45) Date of Patent: Jul. 1, 2008

(54) HEIGHT ADJUSTING STRUCTURE

(76) Inventors: Po-Sen Chiu, 7F., No. 158, Gancheng Rd., Banciao City, Taipei County (TW); Ching-Hui Yen, 7F., No. 158, Gancheng Rd., Banciao City, Taipei County (TW)

( * ) Notice: Subject to any disclaimer, the term of this patent is extended or adjusted under 35 U.S.C. 154(b) by 135 days.

(21) Appl. No.: 11/528,510

(22) Filed: Sep. 28, 2006

(65) Prior Publication Data

US 2008/0017782 A1    Jan. 24, 2008

(30) Foreign Application Priority Data

Jul. 18, 2006    (TW) .............................. 95126291 A

(51) Int. Cl.
*F16M 11/06* (2006.01)

(52) U.S. Cl. ................ 248/676; 248/123.11; 248/125.2; 248/176.3; 248/655; 248/920

(58) Field of Classification Search ................. 248/655, 248/656, 676, 125.1, 125.2, 123.11, 176.1, 248/176.3, 917, 919, 920, 922, 923; 361/681–683, 361/686; 108/106, 147
See application file for complete search history.

(56) References Cited

U.S. PATENT DOCUMENTS 2,531,925 A * 11/1950 Taylor et al. ................ 108/147
2,628,142 A *  2/1953 Dubach ....................... 248/413
2,655,334 A * 10/1953 Debrie ........................ 248/422
4,235,405 A * 11/1980 Carey ..................... 248/123.11
6,381,125 B1 *  4/2002 Mizoguchi et al. .......... 361/682
6,390,433 B1 *  5/2002 Kasa-Djukic ............ 248/441.1

* cited by examiner

*Primary Examiner*—Korie H. Chan
(74) *Attorney, Agent, or Firm*—Rosenberg, Klein & Lee

(57) ABSTRACT

A height adjusting structure is adapted to support objects and adjust height of the objects, including a supporting body having at least one receiving portion, and at least one side of the receiving portion having a sliding groove with height difference; a shaft tube disposed in the receiving portion and having spiral trails on a surface thereof; a sliding base disposed in the receiving portion and sleeved on the shaft tube, a spiral connecting portion formed in an inner edge of the sliding base and corresponded to the spiral trails; and a torque unit sleeved on the shaft tube and two ends of the torque unit are separately fixed in the axis block and the shaft tube. Whereby the sliding base supports objects and the sliding base is slid along the sliding groove in the receiving portion to adjust height of the objects.

20 Claims, 6 Drawing Sheets

HEIGHT ADJUSTING STRUCTURE

BACKGROUND OF THE INVENTION

1. Field of the Invention

The invention relates to a height adjusting structure and more particularly to a height adjusting structure with easy assembly, less components, and simple operation.

2. Description of the Prior Art

Due to the differences of the gene and growing environment, the height of every one isn't the same. Furthermore, the height of human isn't invariable but increased with time or decreased being aged.

Since the early days, the desks, chairs, the counters, and etc., are designed mostly with height unable to adjust. Although manufactures can plan and produce these furniture with specifications of different heights in advance and satisfy user's heights and use as far as possible, in fact, this in not the truth.

Especially, users have to consider all of family members' height conditions for using when purchasing the furniture. If users use unsuitable furniture over a long period of time, not only it is tired easily but also it influences normal growth and health.

In order to solve the above-mentioned problems so as to prevent unnecessary injury that is to choose exclusive furniture for every one. However, it is expensive and not enough space to place them.

In addition, home appliances, such as the TV displayer, computer displayer, and etc., are indispensable equipment for displaying the digital media image data. Hence, if the displayers can't be adjusted height to a suitable location for users, it is easy to damage human eyesight when using for a long period of time.

The inventor of the present invention recognizes the above shortage should be improved and special effort has been made to research this field. The present invention is presented with reasonable design to resolve the above problems.

SUMMARY OF THE INVENTION

The primary object of the present invention is to provide a height adjusting structure with easy assembly, less components, simple operation, and free in adjustment for achieving the purpose in accordance with human-factors engineering and protecting human eyesight.

To achieve the primary objective stated above, a height adjusting structure is adapted to support objects and adjust height of the objects and comprises a supporting body has at least one receiving portion, and at least one side of the receiving portion has a sliding groove with height difference; an axis block is disposed on a top of the receiving portion; a shaft tube is disposed in the receiving portion and has spiral trails on a surface thereof; a sliding base is disposed in the receiving portion and sleeved on the shaft tube, a spiral connecting portion is formed in an inner edge of the sliding base and corresponded to the spiral trails, and a position-limiting arm is extend from at least one side of the sliding base to the sliding groove; and a torque unit, one end thereof is fixed and the other end thereof is connected with the shaft tube.

Whereby the sliding base supports objects and the sliding base is slid along the sliding groove in the receiving portion to adjust height of the objects, and simultaneously drive the shaft tube to rotate as that the torque unit connected in the shaft tube to be compressed to produce resisting force which equalizes gravity of the supported objects and the sliding base so as to position the sliding base.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
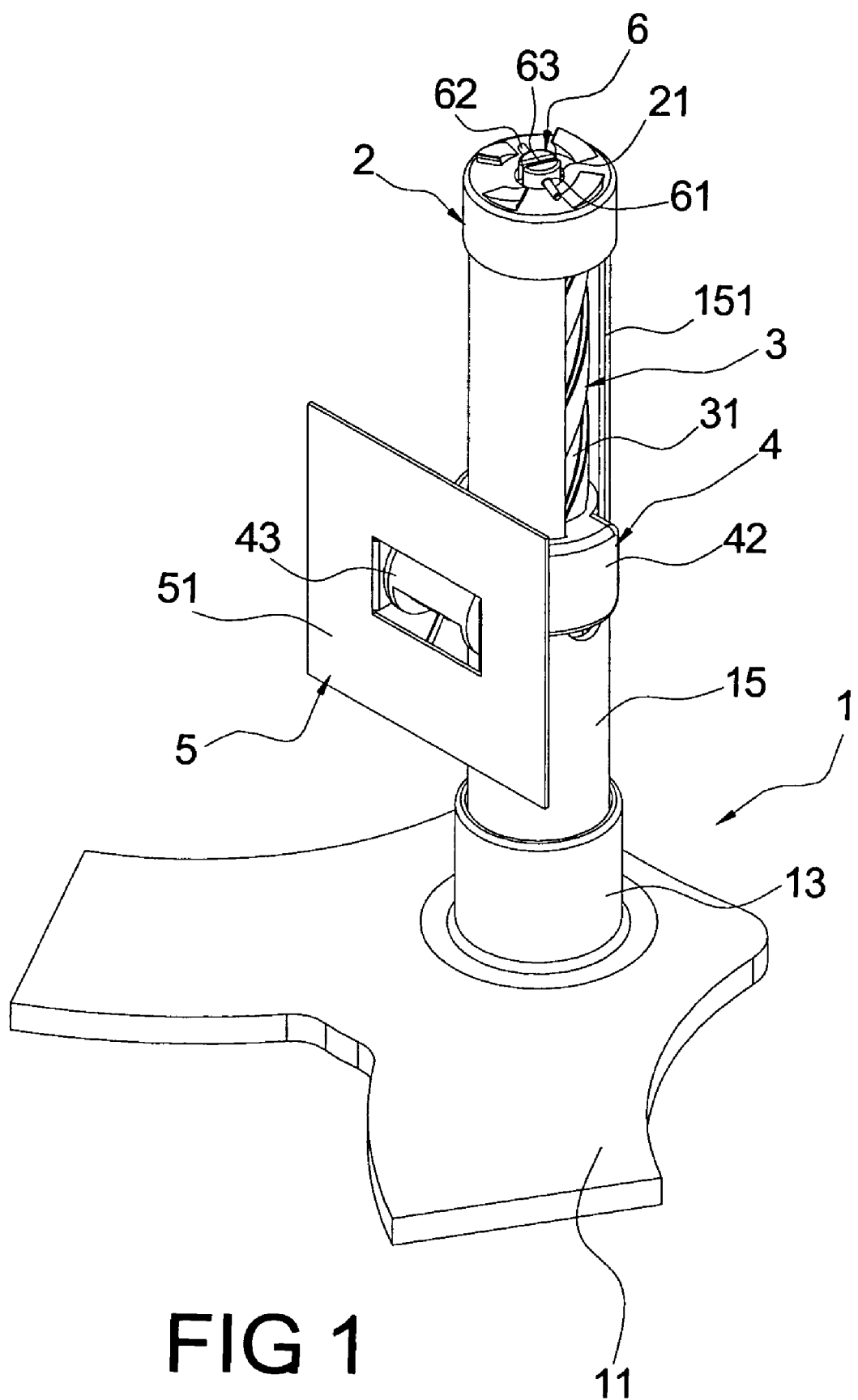
FIG. 1 is an assembled perspective view of a height adjusting structure according to the present invention.
Figure 2:
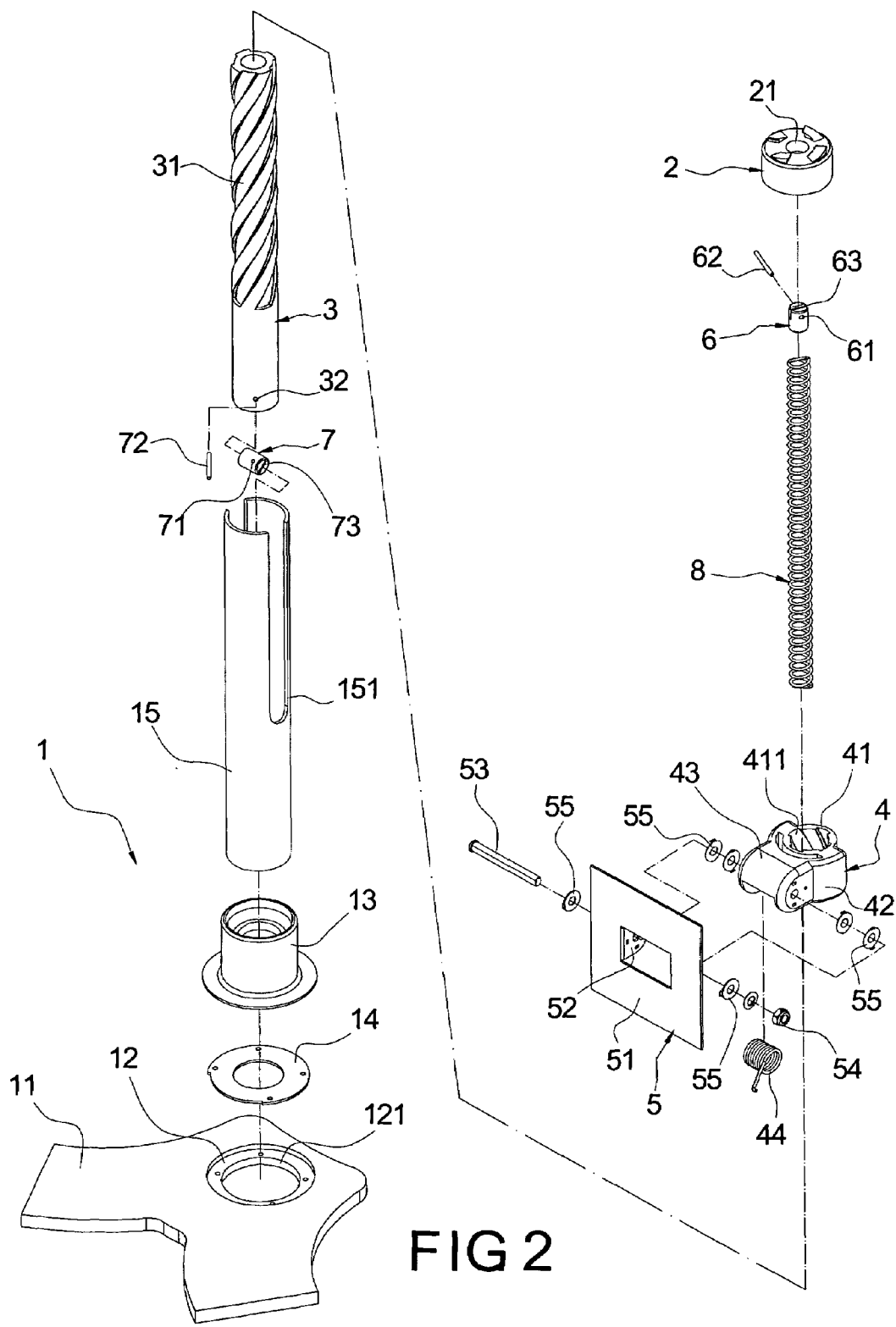
FIG. 2 is an exploded perspective view of a height adjusting structure according to the present invention.
Figure 3:
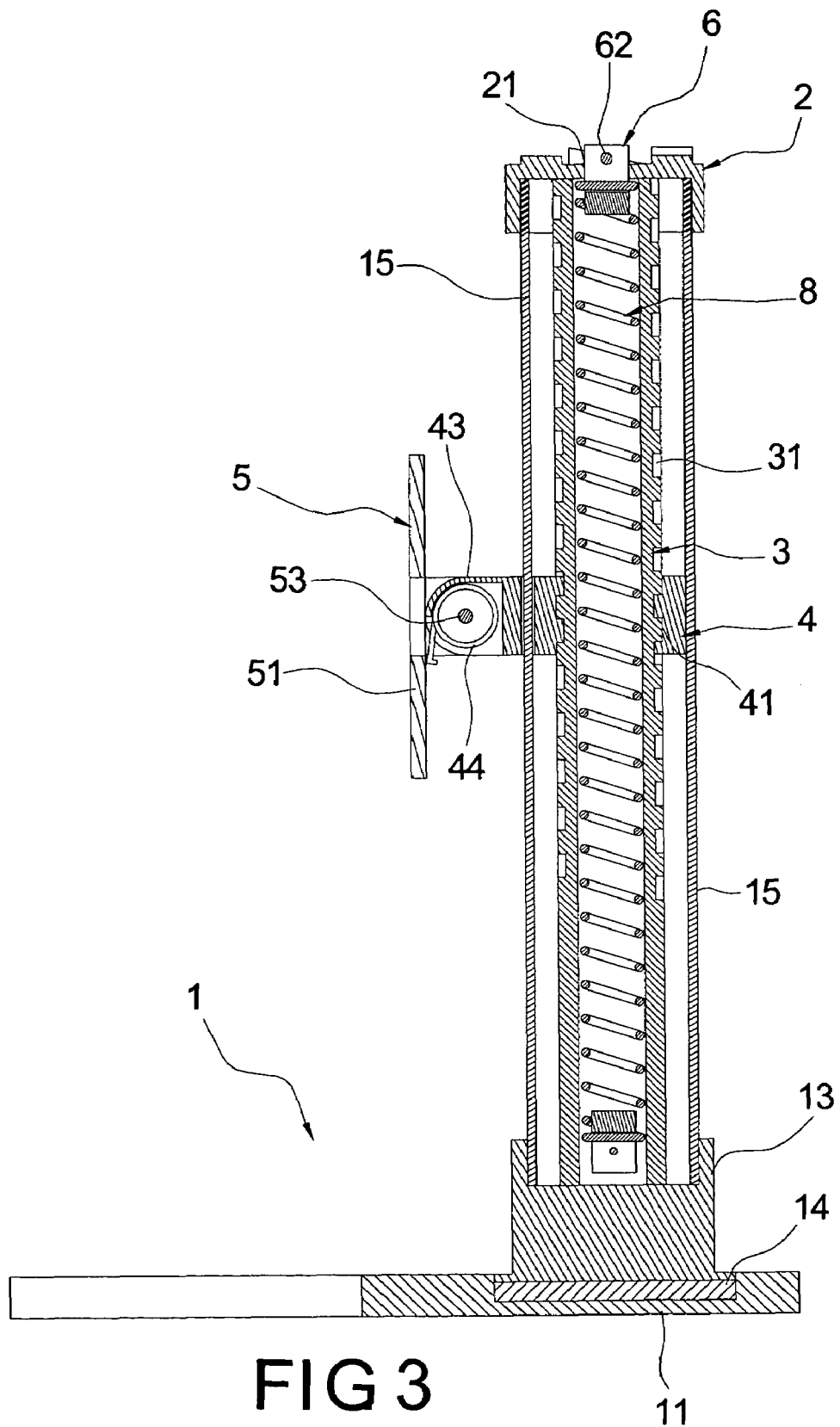
FIG. 3 is a perspective cross-sectional view of a height adjusting structure according to the present invention.
Figure 4:
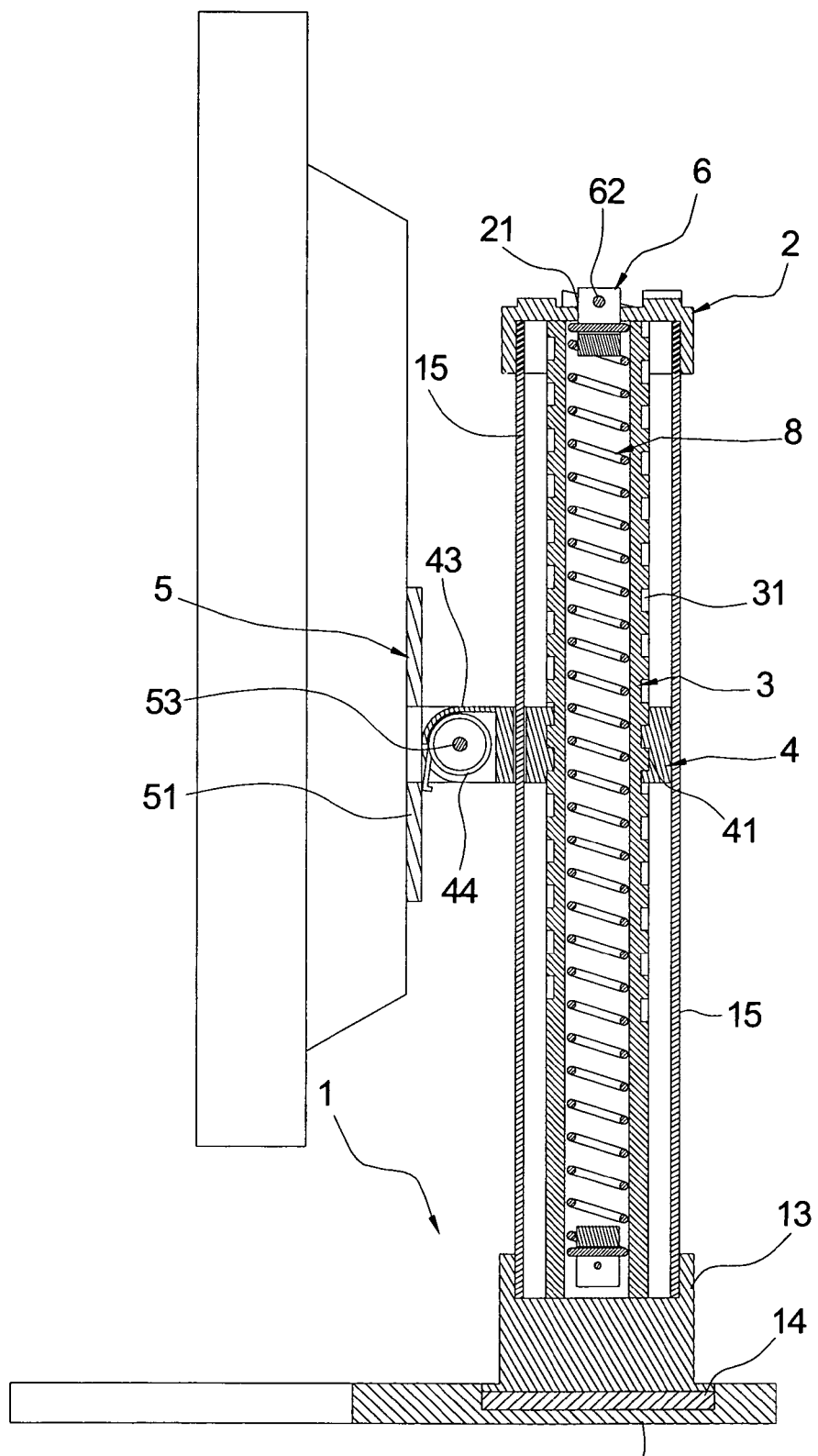
FIG. 4 is a perspective cross-sectional view of a first embodiment of a height adjusting structure according to the present invention.
Figure 5:
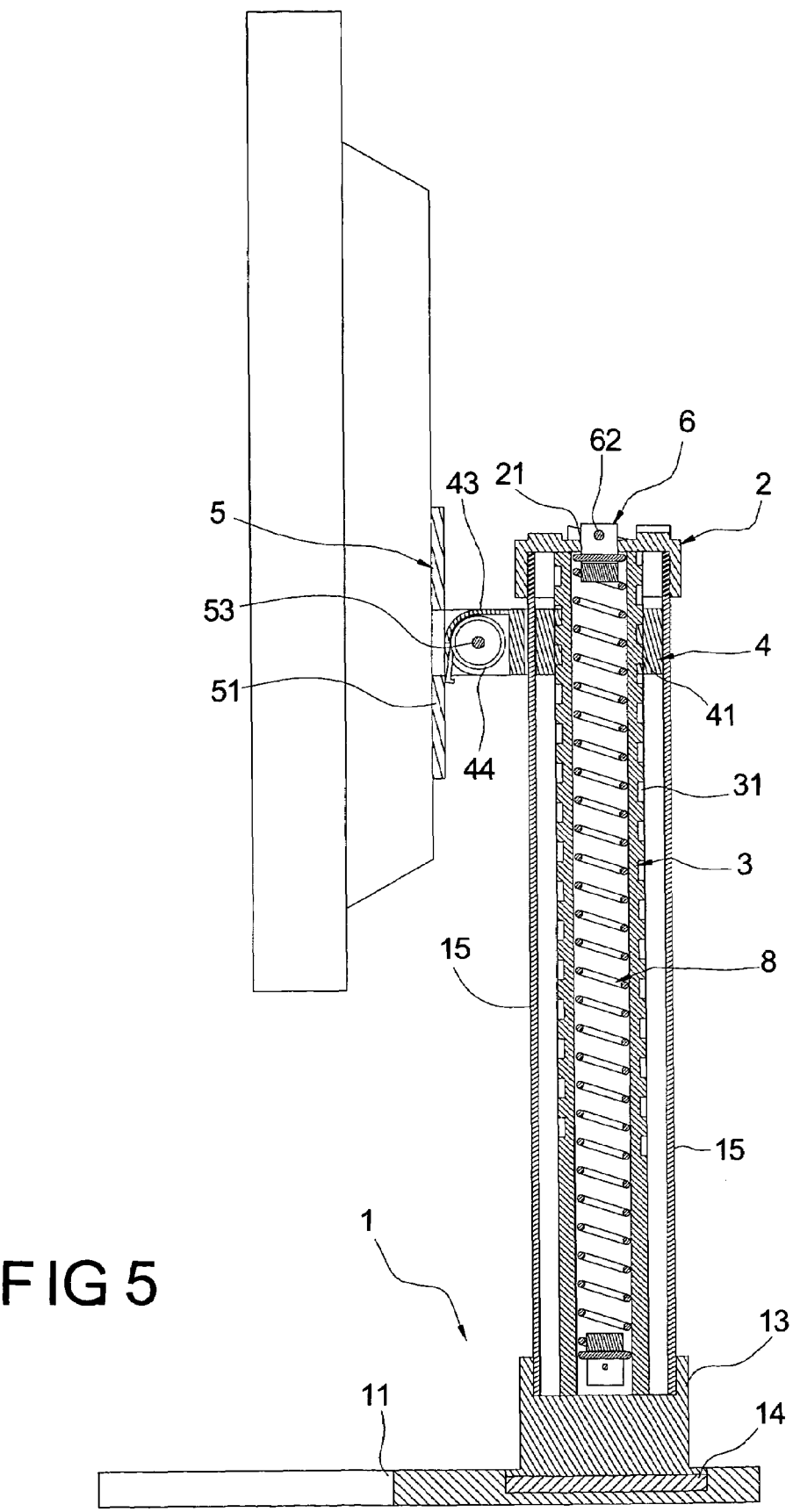
FIG. 5 is an action perspective cross-sectional view of a first embodiment of a height adjusting structure according to the present invention.

References are shown as in FIG. 1 to FIG. 3. A height adjusting structure of the present invention comprises a supporting body 1, an axis block 2, a shaft tube 3, a sliding base 4, a first positioning block 6, a second positioning block 7, and a torque unit 8. The supporting body 1 has a bottom plate 11, the bottom plate 11 has a shallow groove 12 thereon, and the shallow groove 12 has a penetrating hole 121 on a bottom thereof. The bottom plate 11 has a sleeve base 13 thereon fixed in the shallow groove 12, a first washer set 14 is disposed between the sleeve base 13 and the shallow groove 12, and a receiving portion 15 is fixed on the cylindrical sleeve base 13 and has separately a sliding groove 151 with height difference on two side walls of a diameter thereof.

The axis block 2 is disposed on a top of the receiving portion 15 and has an open hole 21 thereon.

The shaft tube 3 is disposed in the receiving portion 15 and has spiral trails 31 on a surface thereof, and the shaft tube 3 has separately a positioning hole 32 on two sides of a diameter thereof.

The sliding base 4 has a sleeve tube 41 disposed in the receiving portion 15 and sleeved in the shaft tube 3, and a spiral connecting portion 411 is formed in an inner edge of the sleeve tube 41 of the sliding base 4 and corresponded to the spiral trails 31. Two sides of the sleeve tube 41 of the sliding base 4 separately extends a position-limiting arm 42 from the sliding groove 151, and the position-limiting arm 42 is curved to encircle by corresponding the two position-limiting arms 42. A connecting element 5 is assembled at an end of the two position-limiting arms 42 and has a plate 51, and two rear end of the plate 51 has separately a side plate 52. The position-limiting arm 42 has a covering housing 43 on the end thereof, a short shaft 53 is used to penetrate through the two side plates 52, the two position-limiting arms 42 and the covering housing 43, and an end of the short shaft 53 is locked by a nut 54 for positioning the connecting element 5. The short shaft 53 can sleeve a second washer set 55 thereon to enhance combination between the two side plates 52 of the connecting element 5 and the two position-limiting arms 42. The covering housing 43 has an elastic element 44 therein and one end of the elastic element 44 is pressed to the plate 51 of the connecting element 5 so as to keep an elevation angle for the connecting element 5.

The axis block 2 has a open hole 21 thereon for the first positioning block 6 being penetrating from a bottom of the axis block 2, the first positioning block has a first through hole 61 on a side thereof, and a positioning pin 62 is penetrated to the first through hole 61 and disposed on a top surface of the axis block 2 for fixing the first positioning block 6. Besides, the first positioning block 6 has a first fastening slot 63 on a top thereof for fixing one end of the torque unit 8.

The second positioning block 7 has a second through hole 71 on a side thereof, the shaft tube 3 has separately a positioning hole 32 on two sides of a diameter thereof, and a second positioning pin 72 is penetrated to the second through hole 71 and disposed on the two positioning holes 32 of the shaft tube 3 for fixing the second positioning block 7. Besides, the second positioning block 7 has a second fastening slot 73 on a bottom thereof for fixing the other end of the torque unit 8.

The torque unit 8 is sleeved in the shaft tube 3 and is a torque spring, and two ends of the torque unit 8 are separately fixed in the first fastening slot 63 of the first positioning block 6 and the second fastening slot 73 of the second positioning block 7.

As shown in FIG. 1, FIG. 2, FIG. 4 and FIG. 5, user can fix the object, such as the TV displayer or the computer displayer, on the plate 51 of the connecting element 5 to be supported by the sliding base 4 and can be adjusted height by sliding the sliding base 4 along the sliding groove 151 in the receiving portion 15, and simultaneously the spiral trail 31 of the shaft tube 3 is driven to rotate by engaging the spiral connecting portion 411 of the sliding base 4 so that the torque unit 8 connected in the shaft tube 3 to be compressed to produce resisting force witch equalizes gravity of the supported objects and the sliding base 4 so as to position the sliding base 4. In addition, the covering housing 43 has an elastic element 44 therein and one end of the elastic element 44 is pressed to the plate 51 of the connecting element 5 so as to keep an elevation angle for the supported object.

Figure 6:
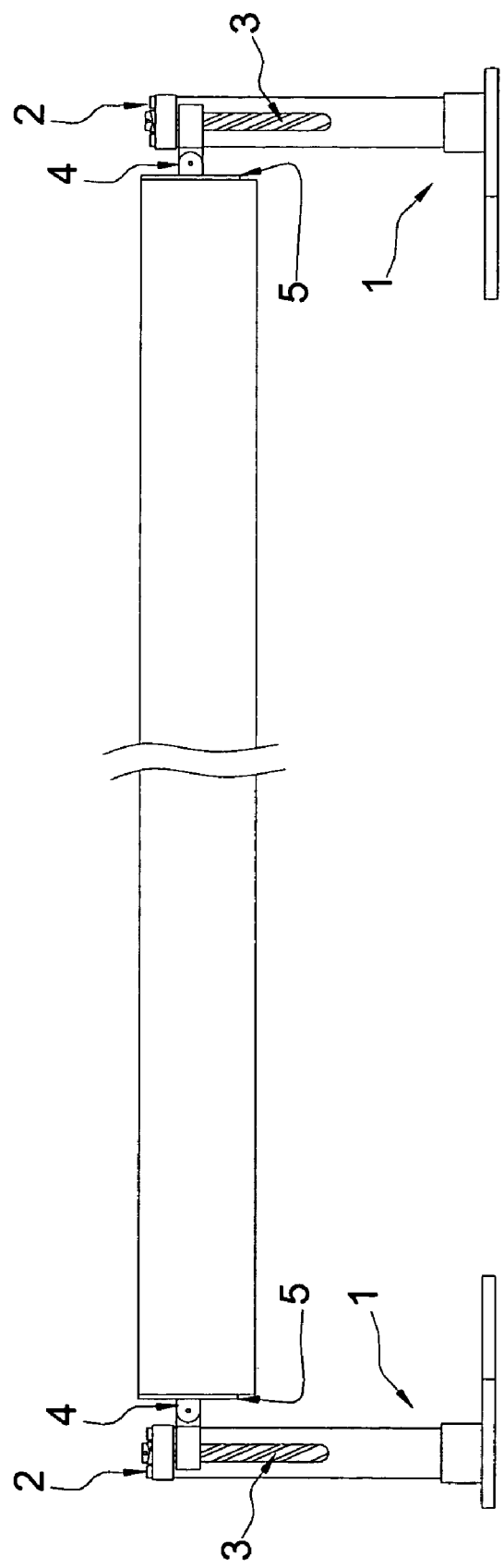
FIG. 6 is a side perspective view of a second embodiment of a height adjusting structure according to the present invention.

The second embodiment of the present invention can be applied to common furniture, such as desk, chair or counter. As shown in FIG. 2, FIG. 3 and FIG. 6, the height adjusting structure can be disposed on four corners of the desk to fix the desk on the plate 51 of the connecting element 5 so that the sliding base 4 supports the desk and the desk can be adjusted height by sliding the sliding base 4 along the sliding groove 151 in the receiving portion 15. The third embodiment of the present invention, wherein one end of the torque unit 8 is fixed directly on the supporting body 1 or the axis block 2 and the other end of the torque unit 8 is connected with the shaft tube 3.

As the above-mentioned structure, the spiral trail 31 of the shaft tube 3 is driven to rotate by engaging the spiral connecting portion 411 of the sliding base 4 so that the torque unit 8 connected in the shaft tube 3 to be compressed to produce resisting force witch equalizes gravity of the supported objects and the sliding base 4 so as to position the sliding base 4 at any position.

In conclusion, the height adjusting structure of the present invention has the following advantages:

1. The sliding base 4 is used to support objects and is slid along the sliding groove 151 in the receiving portion 15 to adjust height of the objects so as to simplify structure, assemble easily, reduce substantially production costs and assembly time.

2. The shaft tube 3 is driven simultaneously to rotate by engaging the spiral connecting portion 411 of the sliding base 4 so that the torque unit 8 connected in the shaft tube 3 to be compressed to produce resisting force witch equalizes gravity of the supported objects and the sliding base 4 to position the sliding base 4 without any extra positioning elements so as to save components, operate conveniently.

3. The present invention can be used to adjust height of connect common furniture, such as desk, chair, counter, and etc., home appliances, such as TV displayer, computer displayer, and etc., to fit in with different height of the users so as to design for human use and protect human eyesight.

4. All of the receiving portion 15, axis block 2, shaft tube 3, sliding base 4, and the torque unit 8 are cylindrical to reduce efficiently whole size and save use space.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A height adjusting structure for supporting objects and adjusting height of the objects, comprising:
   a supporting body having at least one receiving portion, and at least one side of the receiving portion having a sliding groove with height difference;
   an axis block disposed on a top of the receiving portion;
   a shaft tube disposed in the receiving portion and having spiral trails on a surface thereof;
   a sliding base disposed in the receiving portion and sleeved on the shaft tube, a spiral connecting portion formed in an inner edge of the sliding base and corresponded to the spiral trails, and a position-limiting arm extend from at least one side of the sliding base, wherein the position-limiting arm passes through the sliding groove; and
   a torque unit having two end, one end thereof fixed and the other end thereof connected with the shaft tube;
   whereby the sliding base supports objects and the sliding base is slid along the sliding groove in the receiving portion to adjust height of the objects, and simultaneously drive the shaft tube to rotate so that the torque unit connected in the shaft tube is compressed to produce resisting force which equal to gravity of the supported objects with the sliding base so as to position the sliding base.

2. The height adjusting structure as claimed in claim 1, wherein the supporting body has a bottom plate, and the receiving portion is disposed on the bottom plate.

3. The height adjusting structure as claimed in claim 2, wherein the bottom plate has a sleeve base thereon, and the receiving portion is fixed on the sleeve base.

4. The height adjusting structure as claimed in claim 3, wherein the bottom plate has a shallow groove thereon, and the sleeve base is fixed in the shallow groove.

5. The height adjusting structure as claimed in claim 4, wherein the shallow groove has a penetrating hole on a bottom thereof.

6. The height adjusting structure as claimed in claim 4, wherein the sleeve base and the shallow groove have a first washer set between themselves.

7. The height adjusting structure as claimed in claim 1, wherein the receiving portion has separately a sliding groove on two sides of a diameter thereof.

8. The height adjusting structure as claimed in claim 1, wherein one end of the torque unit is fixed in the axis block.

9. The height adjusting structure as claimed in claim 1, wherein two ends of the torque unit are separately fixed in a first positioning block and a second positioning block, and the first positioning block is fixed in the axis block and the second positioning block is fixed in the shaft tube.

10. The height adjusting structure as claimed in claim 9, wherein the axis block has a open hole thereon for the first positioning block being penetrating from a bottom of the axis block, the first positioning block has a first through hole on a side thereof, and a first positioning pin is penetrated to the first through hole and disposed on a top surface of the axis block for fixing the first positioning block.

11. The height adjusting structure as claimed in claim 9, wherein the first positioning block has a first fastening slot on a top thereof for fixing one end of the torque unit.

12. The height adjusting structure as claimed in claim 9, wherein the second positioning block has a second through hole on a side thereof, the shaft tube has separately a positioning hole on two sides of a diameter thereof, and a second positioning pin is penetrated to the second through hole and disposed on the two positioning holes of the shaft tube for fixing the second positioning block.

13. The height adjusting structure as claimed in claim 9, wherein the second positioning block has a second fastening slot on a bottom thereof for fixing the other end of the torque unit.

14. The height adjusting structure as claimed in claim 1, wherein the sliding base has a sleeve tube, the spiral connecting portion is disposed in an inner wall of the sleeve tube, and two sides of the sleeve tube are separately extended a position-limiting arm.

15. The height adjusting structure as claimed in claim 1, wherein the position-limiting arm can be assembled a connecting element on an end thereof.

16. The height adjusting structure as claimed in claim 15, wherein the position-limiting arm has a covering housing on the end thereof, and the covering housing has an elastic element therein and one end of the elastic element is pressed to the connecting element so as to keep an elevation angle for the connecting element.

17. The height adjusting structure as claimed in claim 16, wherein the connecting element has a plate, the plate has separately a side plate on rear thereof, and a short shaft is used to penetrate through the side plate and the position-limiting arm and an end of the short shaft is locked by a nut for positioning the connecting element.

18. The height adjusting structure as claimed in claim 1, wherein the torque unit is a torque spring.

19. The height adjusting structure as claimed in claim 1, wherein the torque unit is sleeved in the shaft tube.

20. The height adjusting structure as claimed in claim 1, wherein one end of the torque unit is fixed on the supporting body.

* * * * *